US006416103B1

United States Patent
Laudenbach et al.

(10) Patent No.: US 6,416,103 B1
(45) Date of Patent: Jul. 9, 2002

(54) PROTECTIVE DEVICE FOR THE INTERIOR OF A MOTOR VEHICLE

(75) Inventors: Thomas Laudenbach, Rottenburg; Holger Seel, Aidlingen; Werner P. Schlecht, Vaihingen/Enz-Aurich, all of (DE)

(73) Assignee: BOS GmbH & Co. KG, Aichwald (DE)

( * ) Notice: Subject to any disclaimer, the term of this patent is extended or adjusted under 35 U.S.C. 154(b) by 0 days.

(21) Appl. No.: 09/666,531

(22) Filed: Sep. 20, 2000

(30) Foreign Application Priority Data

Sep. 20, 1999 (DE) .......................... 199 44 948

(51) Int. Cl.⁷ .............................. B60R 13/00; B60R 5/04
(52) U.S. Cl. ..................................... 296/37.1
(58) Field of Search ................... 296/37.16, 98

(56) References Cited

U.S. PATENT DOCUMENTS 3,819,082 A  *  6/1974  Rosenvold
5,354,113 A  *  10/1994  Pettersson
6,003,920 A  12/1999  Crisp ........................ 296/37.1
6,220,646 B1 *  4/2001  Merino Lamela

FOREIGN PATENT DOCUMENTS

| DE | 198 25 353 | 12/1998 |
| DE | 198 47 787 | 6/1999 |
| WO | WO 98/24657 | 6/1998 |

* cited by examiner

Primary Examiner—Stephen T. Gordon
Assistant Examiner—Scott Carpenter
(74) Attorney, Agent, or Firm—Crowell & Moring LLP

(57) ABSTRACT

A protective device for the interior of a motor vehicle has a protective structure which has a planar shape in a protective position and which is seated for movement by a drive mechanism between at least two positions. The protective structure is connected with at least one guide element that can be entrained by at least one coupling member with transfer structure to the drive mechanism. The at least one coupling member is provided with at least one picking-up element that acts in transverse direction to the direction of movement of the coupling member and that entrains, releases or picks up the guide element with limited entraining force during movement of the coupling member. The protective device is usable for cargo area coverings, cargo area dividers and sun-protection roller blinds.

27 Claims, 6 Drawing Sheets

PROTECTIVE DEVICE FOR THE INTERIOR OF A MOTOR VEHICLE

BACKGROUND AND SUMMARY OF THE INVENTION

This application claims the priority of German patent document 199 44 948.1, filed Sep. 20, 1999, the disclosure of which is expressly incorporated by reference herein.

The present invention relates to a protective device for the interior of a motor vehicle having a protective structure, which can be spread out in a protective position to an at least approximately planar shape and which is seated for being transferred by a drive mechanism between at least two positions, the protective structure being connected with at least one guide element that can be entrained with transfer means of the drive mechanism by at least one coupling member.

A protective device according to the invention may be designed either as a horizontally movable cargo area covering, or as a separating device with a vertically extensible divider net, or as a roller blind for use as a sun shield for at least one window of a motor vehicle.

A protective device in the form of a cargo area covering has been known from German Patent Document DE 198 25 353 A1. The known cargo area covering comprises a horizontally extensible roller blind that can be moved, by electric drive means, between a home position in which the cargo area is exposed and a protective position in which the cargo area is covered. The covering roller blind comprises at its front end—viewed in the pull-out direction—a pull-out bar whose opposite ends project laterally beyond the roller blind that serves as the protective structure. These ends form guide elements that are respectively retained in a U-shaped upwardly open coupling member. Each coupling member is fixed to a toothed belt, serving as a transfer element, that extends in the pull-out direction, i.e. in horizontal alignment. Each toothed belt can be operated by means of an electric drive motor. The two drive motors can be controlled in a mutually co-ordinated way so that the pull-out bar and, thus, the covering roller blind can be pulled out or retracted in parallel. The ends of the pull-out bar that serve as guide elements can be removed from the coupling member in upward direction. Similarly, the pull-out bar can be reinserted between the coupling members from the top, whereby the covering roller blind can be connected again with the drive means.

If the pull-out bar were to hit against an obstruction when being pulled out or being retracted by the drive means, then the drive means and/or the pull-out bar may be damaged. In order to prevent any such occurrence there would be the possibility—not disclosed in German Patent Document DE 198 25 353 A1—to monitor the load of the drive motors and to cause the direction of the drive to be reversed if an increase in load should be detected. Such devices are generally known in connection with the automatic opera-ion of vehicle window panes.

Now, it is an object of the present invention to provide a protective device of the kind described above that guarantees, by simple means, perfect and safe movement of the protective structure even in the case of trouble.

This object is achieved by the fact that at least one coupling member is provided with at least one picking-up element that has a limited retaining force for the force-dependent picking-up, entraining and release of the guide element during movement of the coupling member. Depending on whether the counter-force, that acts on the protective structure and the at least one guide element, is greater or smaller than the limited entraining force of the at least one picking-up element, the guide element is picked up from a stationary position, released from a position in which it has been entrained by the coupling member or—in the case of forces smaller than the retaining force—entrained by the coupling member for common movement.

The solution according to the invention is suited for both, protective structures with only a single guide element and for protective structures having two or more guide elements. Depending on the particular configuration, a single coupling member or a plurality of coupling members may be provided. The drive means may have a single drive unit or a plurality of drive units. The drive unit comprises preferably a single central electric drive that imparts, by suitable synchronisation, a parallel guiding effect to the protective structure via two guide elements arranged on opposite sides. The solution according to the invention guarantees that the respective protective structure, be it a divider net, a covering roller blind of a cargo area covering, or a sun-protection roller blind, can be automatically transferred by the drive means into the desired position. Since when a load higher than that of the drive means occurs the at least one guide element and, thus, the protective structure will be uncoupled from the drive means, no overloading of the drive means can occur.

Due to the force-dependent coupling or uncoupling the at least one guide element will be released from the coupling member automatically and forcedly in the event the protective structure should hit upon an obstruction, while the coupling member will be moved on by the drive means. When the coupling member overruns the position of the guide element the next time—preferably in the opposite direction—the guide element will be automatically picked up again and carried off with the movement of the coupling member.

Uncoupling can be achieved in a simple way by the fact that the protective structure is moved manually in the direction of movement or in a direction opposite to the direction of movement of the drive means, whereby the protective structure is uncoupled. Thus, the coupling member has only a limited coupling force in the respective direction of movement of the at least one coupling member, through its at least one picking-up element. When this coupling force (entraining force) is exceeded, the protective structure is released from the at least one coupling member. Similarly, the guide element and, thus, the protective structure is connected again with the at least one coupling member as soon as the coupling member reaches once more the position of the guide element in the course of the corresponding reverse movement. It is, therefore, important that the guide element be always guided in the path of movement of the coupling member. The guide element remains in this path of movement even after it has been uncoupled, so that when the coupling member and the guide element meet the next time they are coupled once more. Thus, by overloading the coupling beyond the limited entraining force, i.e. coupling force, the at least one guide element and, thus, the protective structure will be detached form the drive means. Consequently, in case of a current failure, this also allows easy operation by hand without there being any need—as is the case with systems of the prior art—for manually re-engaging the at least one guide element in the coupling member later. Picking up of the at least one guide element and, thus, of the protective structure by the at least one coupling member is always effected automatically and, thus, forcedly in the solution according to the invention.

The invention thus provides considerably improved operating comfort as compared to the prior art.

Overloading by obstructions found in the path of the protective structure is avoided. The at least one coupling member may be seated in horizontal or in vertical vehicle-mounted guides or in similar guides that are inclined in space. The guides may be parallel or non-parallel one relative to the other. In the case of non-parallel guides, length-compensation means are provided for the guide elements and the protective structure between the guides. The at least one coupling member is in any case forcedly guided in the same way as the at least one guide element of the protective structure in order to be able, as a result of the identical path of movement, to pick up the respective guide element every time it meets it.

In order to achieve a limited entraining force for the at least one picking-up element, the picking-up element may me movable in mechanically spring-loaded fashion. It is however also contemplated according to certain embodiments to provide the picking-up element and the guide element of the protective structure with corresponding magnetic elements. Embodiments with other force-locking or shape-locking connections with corresponding force limitation are also contemplated by the invention.

According to certain embodiments of the invention each coupling member is seated for linear movement in a vehicle-mounted guide section to which the corresponding guide element is also associated. This guarantees that the coupling member will S find the guide section again, after it has been transitorily separated from the coupling member, as soon as it passes once more the position of the guide element.

According to a further development of certain referred embodiments of the invention, the at least one picking-up element of the coupling member is mechanically active and seated to move transversely to the direction of movement of the coupling member, against the force of a return spring, between a holding position and releasing position. Consequently, the at least one picking-up element forms a force-dependent locking element of simple and safe structure, due to the mechanical function.

According to a further development of certain preferred embodiments of the invention, two coupling members, each entraining, releasing or picking up a guide element of the protective structure, are arranged on opposite sides for synchronous linear movement. Those embodiments are particularly well suited for use of the protective device as cargo area covering, where the opposite ends of a pull-out section, which serves as guide element, are each laterally held at limited force in corresponding coupling members that are guided for linear movement.

According to a further development of certain preferred embodiments of the invention, each coupling member has two picking-up elements which are adjusted to opposite directions of movement of the coupling member. The two picking-up elements preferably accommodate the respective guide element between them.

According to a further development of certain preferred embodiments of the invention, the one picking-up element is stronger, with respect to its entraining force, than the other picking-up element. This is of advantage when a tensile or pressure force is exerted upon the protective structure in the direction of movement, independent of the drive means. This is the case, in particular, with cargo area coverings in which the covering roller blind is held on a roller blind shaft that is loaded by a return spring. If the covering is then pulled out by hand, this guarantees that the covering roller blind will return to its home position immediately after unlocking. The described configuration is provided in order to prevent the respective tensile force or pressure force from being added to the drive force of the drive means and from thereby causing the at least one guide element to get detached from the picking-up element.

According to a further development of certain preferred embodiments of the invention, at least one stationary stop, serving to secure the protective structure in different positions, is associated to the at least one guide element, which stop can be transferred, by means of the at least one coupling member, into a releasing position in which it permits the protective structure to move. Consequently, such stationary movable stops are also found in the path of movement of the at least one coupling member so that when the stops are overrun by the at least one coupling member they will be forcedly transferred into the releasing position. This guarantees that the protective structure will be retained in the respective position by the stop so long as it is not picked up by the coupling member.

According to a further development of certain preferred embodiments of the invention, the stops are configured as spring-loaded, elastically resilient blocking elements provided with ramps for the respective coupling member. One thereby achieves simple releasing of the stops as soon as the coupling member passes the corresponding position of the respective stop. Preferably, corresponding stops are provided at least for the two end positions of the protective structure, i.e. a home position and a fully pulled-out protective position. Basically, however, it is also possible to provide only a single stop for the pulled-out protective position if the protective structure is held in the home position by a corresponding return spring.

Other objects, advantages and novel features of the present invention will become apparent from the following detailed description of the invention when considered in conjunction with the accompanying drawings.

DETAILED DESCRIPTION OF THE DRAWING

While the solution according to the invention will be described hereafter with reference to different embodiments of a protective device in the form of a cargo area covering for a station wagon, the solution according to the invention is not limited to the described embodiments, but extends also to other types of protective devices according to the invention, especially divider devices between the cargo area and the passenger compartment in a station wagon and roller blinds as sun shields for vehicle windows.

Figure 1:
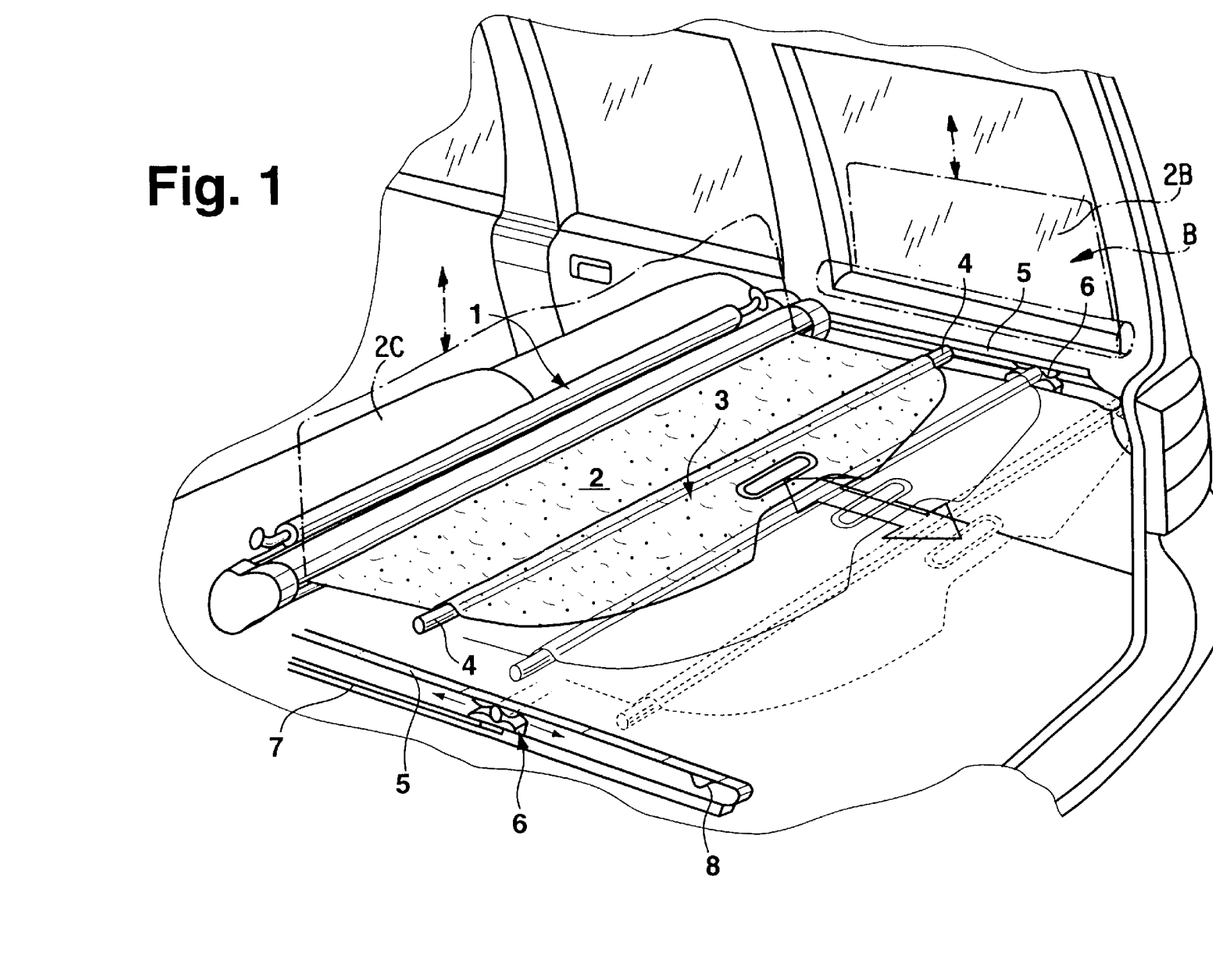
FIG. 1 shows a perspective view of one embodiment of a protective device according to the invention, designed as cargo area covering.
Figure 2:
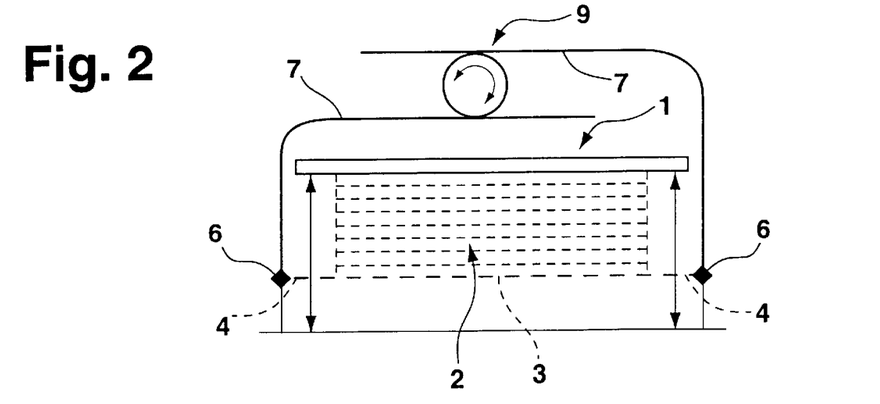
FIG. 2 shows a diagrammatic top view of the cargo area covering according to FIG. 1.
Figure 3:
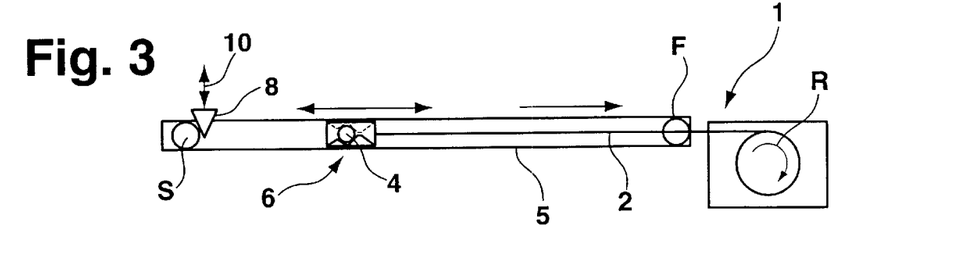
FIG. 3 shows again a diagrammatic side view of the protective device according to FIGS. 1 and 2.

The cargo area covering 1 according to the invention, as illustrated in FIGS. 1 to 3, comprises a protective structure in the form of a tarpaulin 2 that is retained on a roller blind shaft seated in a cassette housing. The cassette housing is fixed in stationary arrangement in the cargo area, as is generally known. At its front end, viewed in the pull-out direction, the tarpaulin 2 is provided with a pull-out element 3 in the form of a contour member that carries a pull-out bar extending transversely over the full width of the tarpaulin 2. The opposite ends of the pull-out bar extend laterally beyond the tarpaulin 2 and form respective guide elements 4 that are seated for horizontal displacement in horizontal, vehicle-mounted guide sections 5.

Guided for linear movement in each guide section 5 is a driver slide 6, serving as coupling member, whose path of movement is adjusted to the guiding path of the respective guide element 4 of the tarpaulin 2 that projects into the guide section 5. The driver slides 6 in each guide section 5 can be moved by drive means 7, 9 in synchronism one with the other in the respective guide section 5. The drive means 7, 9 comprises a central electric drive unit in the illustrated embodiment according to FIG. 2. Flexible toothed rods, which are however rigid against tensile forces and pressure, serve as transfer means 7 to the driver slides 6. Similarly, corresponding Bowden cables, threaded shafts, rope or belt drives, or transfer means of other form may be provided. The drive means may also comprise two separate electric drive motors for the two sides of the cargo area covering, which are synchronised with respect to their movement by means of an electric control. Each driver slide 6 is fixed on the respective transfer means 7 so that any movement of the respective transfer means 7 will necessarily provoke a forced movement of the respective driver slide 6.

Each driver slide 6 comprises two picking-up elements or pairs of picking-up elements 11, 13 that cause the respective guide elements 4 of the tarpaulin 2 to be coupled or uncoupled in the respective direction of movement of the driver slide 6. Due to the particular shape of the driver slides 6, each driver slide is open relative to the guide element 4 in both directions of movement so that the respective guide element is permitted to forcedly enter the space between the picking-up elements 11, 13 in the respective direction of movement of the driver slide 6. In the particularly simple embodiment, illustrated in FIG. 4 only diagrammatically, the picking-up elements 11, 13 are designed as resilient, upwardly arched tongues that may be configured either as elements separate from the driver slide 6, or as plastic parts formed integrally with the slide. The tongue-shaped picking-up elements 11, 13 are resilient in transverse direction to the direction of movement—in the illustrated embodiment in vertical direction—, with the arched condition representing the unloaded home position in which the resilience of the tongue-shaped picking-up elements 11 defines the corresponding spring forces 12, 14.

Figure 9:
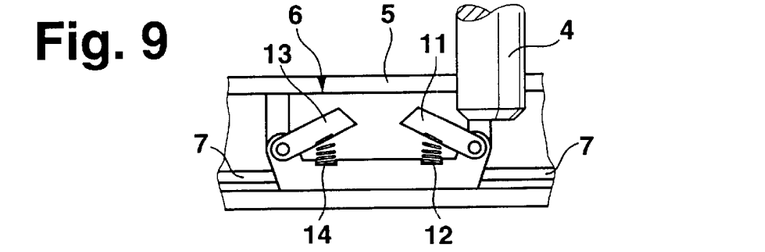
FIGS. 9 to 11 show a diagrammatic top views of a detail of a protective device according to one embodiment of the invention illustrated in FIGS. 1 to 8, in the area of a coupling member provided with two picking-up elements, in different instantaneous positions.
Figure 10:
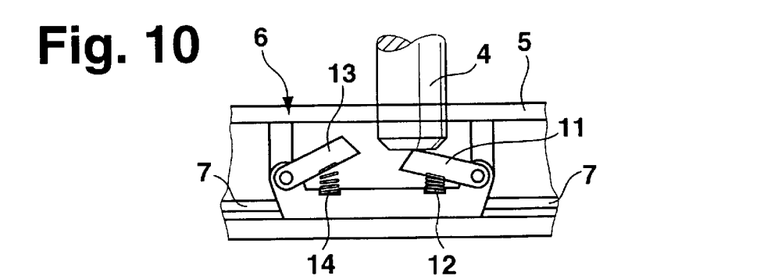
Figure 11:
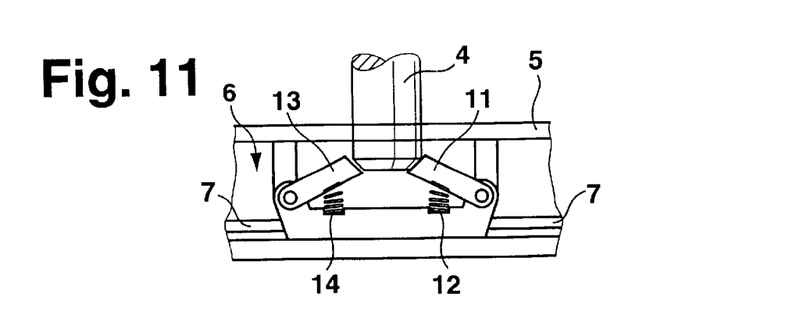

The embodiment illustrated in FIGS. 9 to 11 is similar in function to the embodiments described with reference to FIGS. 1 to 4 so that elements performing the same function are designated by the same reference numerals. The essential difference over the embodiments illustrated in FIGS. 9 to 11 lies in the fact that the picking-up elements 11, 13 are not directly resilient, but that the resilience is achieved by separate spring elements 12, 14. The picking-up elements 11 have a lever-like shape and are inclined in opposite directions so that the end areas of the picking-up elements 11, 13 project into the path of movement of the guide element 4. The end portion of each guide element 4 is conically tapered. Correspondingly, the end portions of the picking-up elements 11, 13 are likewise tapered so that ramps are formed between the guide element 4 and the picking-up elements 11, 13, which ramps enable the guide element 4 to be secured in place between the picking-up elements 11, 13 at limited force. When a force higher than the defined retaining force, i.e. a coupling or entraining force, of the picking-up elements 11, 13 is applied in one of the two horizontal directions of movement of the guide element 4, the guide element 4 will again slide over the respective picking-up element 11, 13, being thereby released from the picking-up elements 11, 13.

FIGS. 9 to 11 illustrate different instantaneous positions in which the driver slide 6 is moved by the respective transfer means to the right in the plane of the drawing, until the guide element 4 gets trapped between the two picking-up elements 11, 13. Now, the guide element 4 and, thus, the pull-out element 3, including the tarpaulin 2, can be moved by the drive means 9 in the desired direction. As soon as an additional force, exceeding the retaining force of the picking-up elements 11, 13 and of the relevant spring elements 12, 14, comes to act on the pull-out element 3 and, thus, on each guide element 4 in the pull-out or retracting direction, each guide element 4 will press down the corresponding picking-up element 11, 13 in the respective direction of movement, whereby the guide element 4 is released from the driver slide 6 in the reverse sequence of operation, as illustrated by the sequence of FIGS. 11, 10 and 9. When the driver slide 6 passes the position of the guide element 4 the next time, in the same or the opposite direction of movement, the guide element is once more picked up and entrained, unless a higher counter-force is once more encountered.

Figure 4:
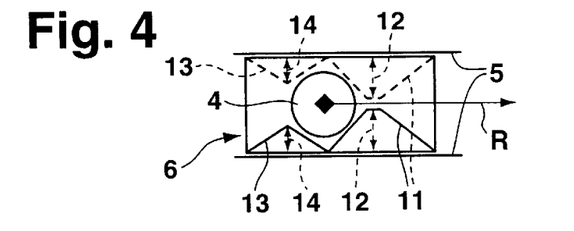
FIG. 4 shows an enlarged diagrammatic representation of a detail of the protective device according to FIG. 3, in the area of a coupling member.
Figure 5:
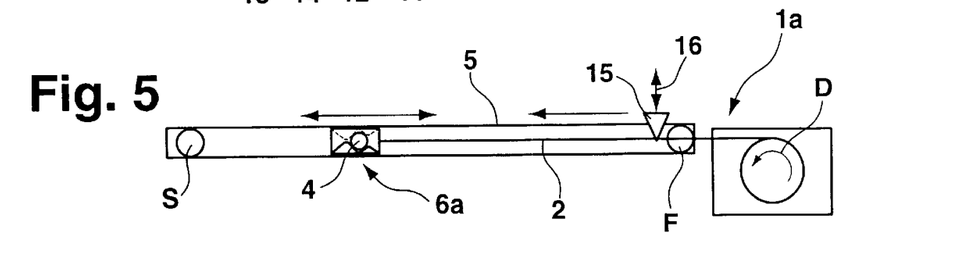
FIG. 5 shows a diagrammatic representation similar to FIG. 3, of another embodiment of a protective device according to the invention.
Figure 6:
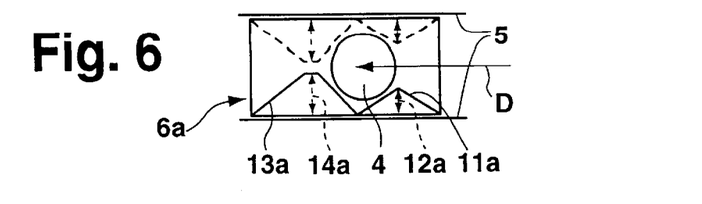
FIG. 6 shows an enlarged diagrammatic representation of a detail of the protective device according to FIG. 5, with the coupling member slightly modified as compared with FIG. 4.

In the embodiments illustrated in FIGS. 1 to 4, the spring forces 12, 14 of the picking-up elements 11, 13 are differently selected in order to compensate for the permanent return force R exerted upon the tarpaulin 2 by a return spring coacting with the roller blind shaft. The retaining force of the spring element 12 and, thus of the picking-up element 11 of the embodiment according to FIGS. 3 and 4 is, therefore, higher by the additional return force R than the retaining force of the spring element 14 of the other picking-up element 13. FIGS. 5 and 6 show the correspondingly inverse configuration. Here, a pressure force D acts upon the protective structure 2 in an angular direction opposite to the return force R according to FIG. 3. Correspondingly, the picking-up element 13a is also provided with a retaining force of a spring element 14a, which is higher than the force of the picking-up element 11a by the amount of the pressure force D. In the case of the driver slide 6b according to FIGS. 7 and 8, equally high tensile forces and pressure forces G act in the opposite directions of movement so that the two picking-up elements 11b and 13b are provided with identical retaining forces and, thus, identical spring elements 12b, 14b. The different embodiments described with reference to FIGS. 3 to 8 may similarly be used in the embodiment according to FIGS. 9 to 11, by giving the return springs 12, 14 identical or different designs.

Figure 7:
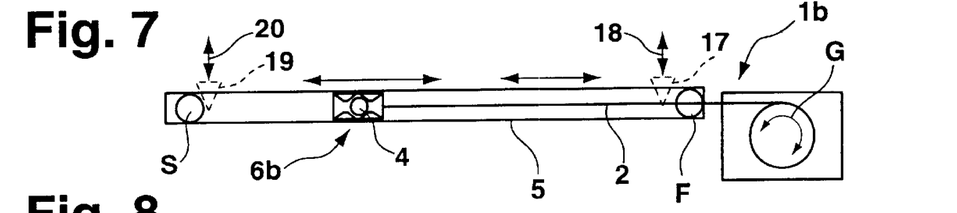
FIG. 7 is a view similar to FIGS. 3 and 5 which show a diagrammatic side view of another embodiment of a protective device according to the invention.
Figure 8:
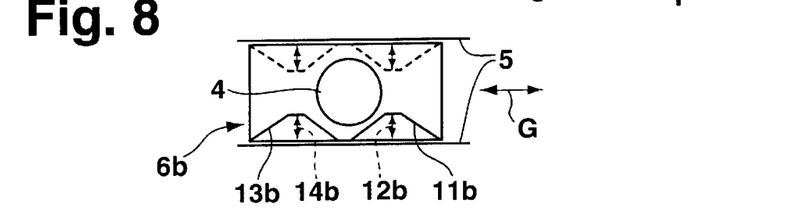
FIG. 8 shows an enlarged diagrammatic representation of a detail of the protective device according to FIG. 7, in the area of a coupling member.

In the embodiments illustrated in FIGS. 3, 5 and 7, the retracted release position is designated by the letter F, the pulled-out protective position of the protective structure 2 is designated by the letter S. In all these embodiments, at least one end position has associated to it at least one stop 8, 15, 17, 19 which is loaded by a spring arrangement 10, 16, 18, 20 and which is stationary but elastically movable transversely to the direction of movement of the respective driver slide 6. The respective slide 8, 15, 17, 19 is arranged in the path of movement of the respective driver slide 6 in such a way that it can be transferred from its blocking position into a releasing position by the driver slide 6, 6a, 6b. Each stop 8, 15, 17, 19 is suitably provided for this purpose with at least one ramp which forcedly causes the stop 8, 15, 17, 19 to withdraw against the action of the respective return force of the associated spring arrangement 10, 16, 18, 20, as the coupling member and, thus, the driver slide 6, 6a, 6b run up against the stop 8. Once the coupling member, i.e. the driver slide 6, 6a, 6b moves away again from the respective stop 8, 15, 17, 19, the latter is forcedly returned to its home position by its respective spring arrangement 10, 16, 18, 20. This allows the driver slide 6, 6a, 6b to move the guide element 4 and, thus, the tarpaulin 2 out of a blocked position even if the latter is locked by a corresponding stop.

Figure 12:
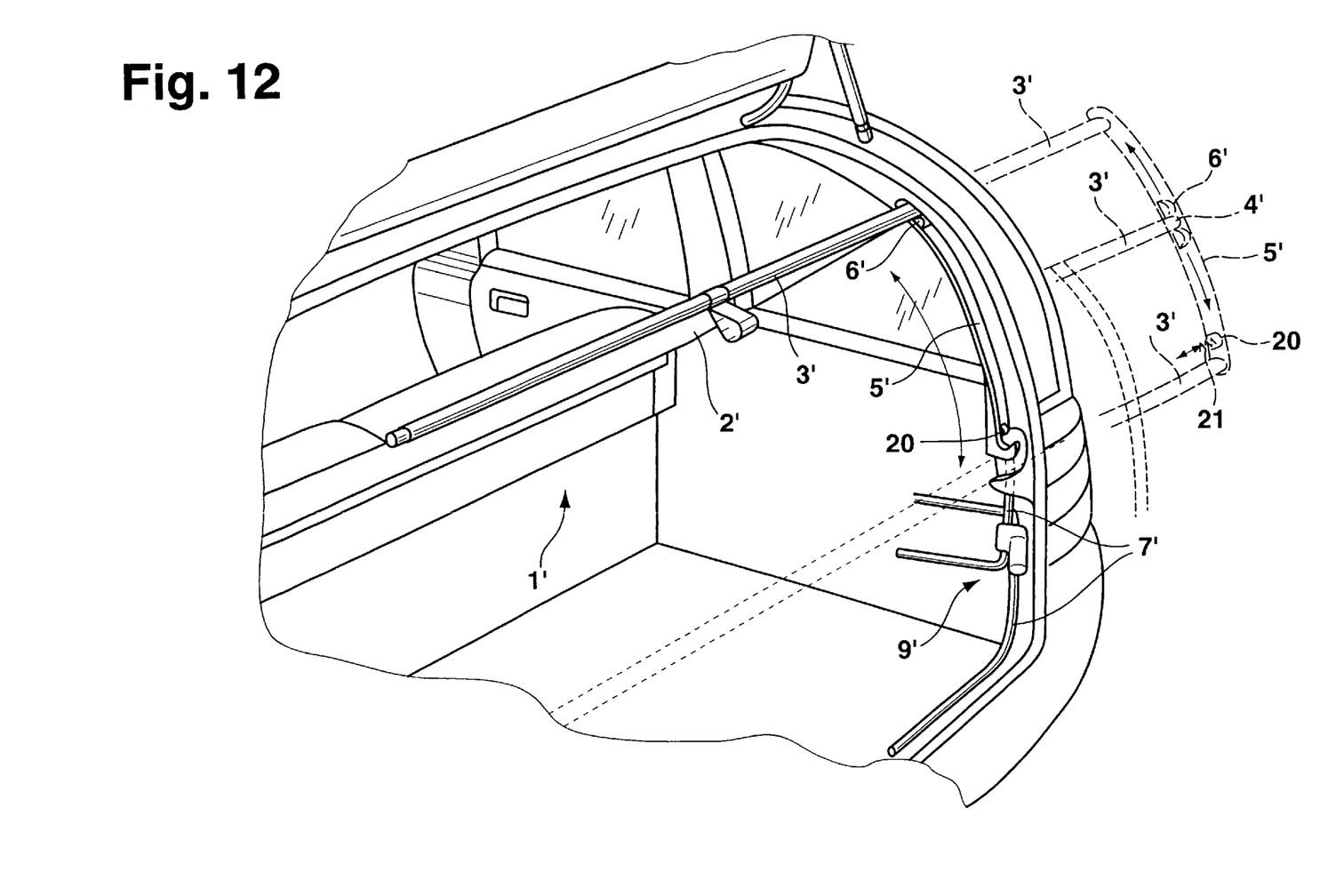
FIG. 12 shows a perspective view of another embodiment of a protective device according to the invention, where for lifting or lowering the protective structure the coupling members are integrated into lateral frame members of a tail gate of a station wagon.

The cargo area covering 1' according to FIG. 12 differs from the cargo area covering according to FIG. 1 insofar as in this case the drive means 9' is arranged for moving the pull-out element 3' and, thus, the tarpaulin 2' in the pulled-out condition obliquely in upward direction and into a comfort position. Basically, the transfer of a cargo area covering into such a comfort position is known from PCT Patent Publication WO 98/24657 to which reference is herewith made in supplementation. In the illustrated embodiment, the tarpaulin 2' can at first be manually transferred from out of its cassette housing into the horizontal covering position, where it can be manually anchored in the area of the rear frame of the tail gate. The transfer into a comfort position, in which it extends obliquely in upward direction and in which the access to the cargo space covered by the tarpaulin 2' is widened, is effected in response to opening or closing of the tail gate by means of the drive means 9', which for this purpose is suitably coupled to the movement of the tail gate through electric or electronic controls. Integrated into each of the opposite sides of the tail gate are guide sections 5', in which a driver slide 6', serving as coupling member, is seated for being moved by the transfer means 7'. Also displaceably seated in the respective guide section 5' is an end portion 4' of the pull-out element 3' that serves as guide element. The lower horizontal protective position of the tarpaulin 2' coacts with a stop 20, which is spring-loaded by means of a spring element 21 and which can be overrun by the driver slide 6' . Generally, the configuration and function of the driver slide 6' and of the whole protective device are identical to the embodiments described before so that they need not be explained in greater detail at this point.

Now, when the tarpaulin 2' , together with its pull-out element 3' , are mounted in their horizontal protective position in the lower area of the guide section 5' , with the tail gate closed, and when the tail gate is then opened, each driver slide 6' will entrain the pull-out element 3' on both sides to the top, under the corresponding control of the drive means 9' , so that in the open condition of the tail gate the tarpaulin 2' is transferred to the comfort position in which it extends obliquely to the top and in which a greater access opening to the cargo space is available under the tarpaulin 2'. When the tail gate is then closed again, the drive means 9' is controlled in the reverse sense whereby the two driver slides 6' on the opposite sides are moved once more in downward direction and beyond the respective stop 20. Removing the pull-out element 3' in this protective position by hand is possible in a simple way because the guide section 5' is correspondingly arched in this area on both sides. If the removal cannot be effected in upward direction, relative to the driver slide 6' , then the pull-out element 3' is simply detached from the respective driver slide 6' , in the upper position of driver slide 6' , by pulling it manually in downward direction, and is then either mounted in the lower protective position or else transferred to its retracted home position.

Figure 13:
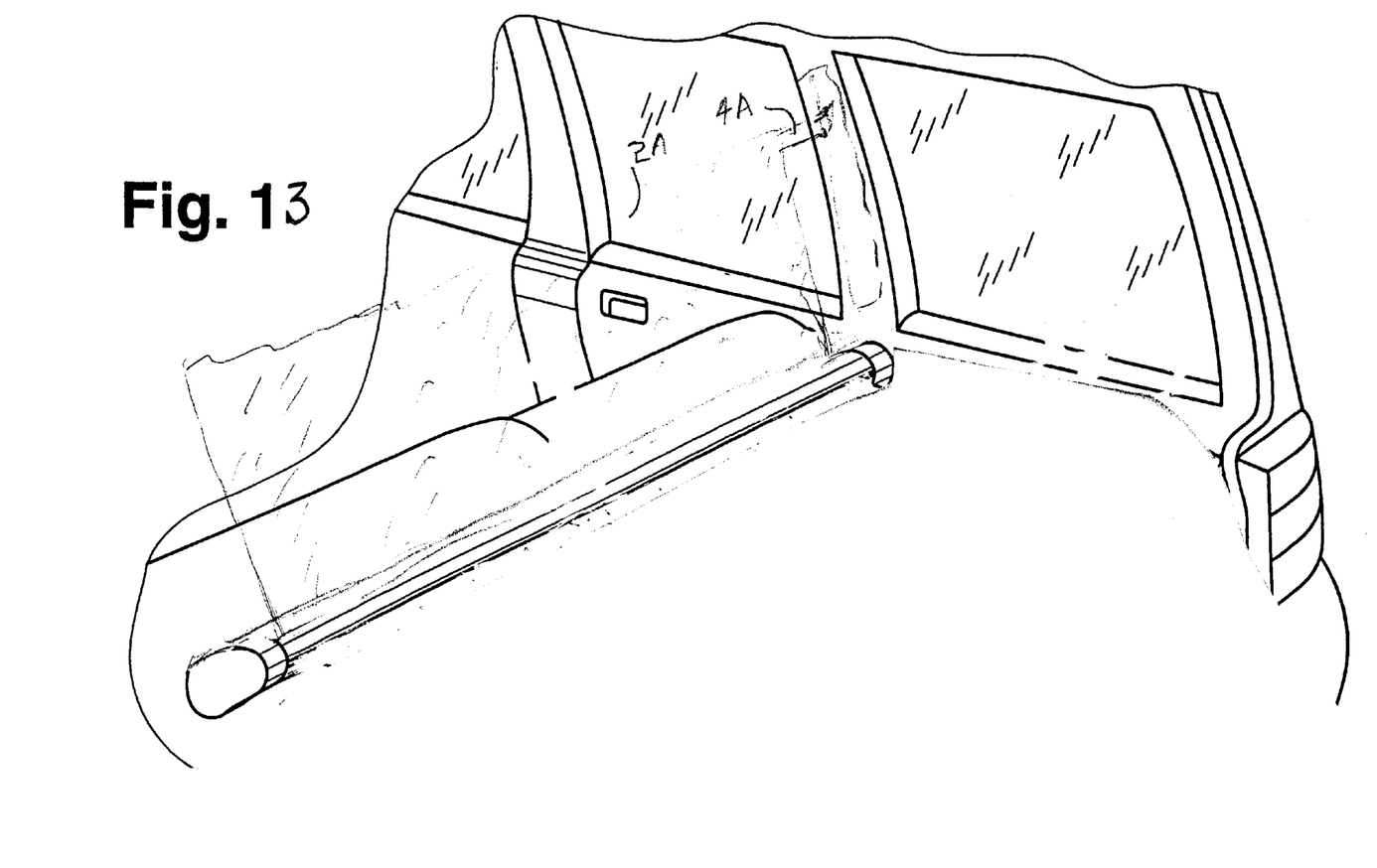
FIG. 13 is a schematic perspective view of another embodiment of a protective device according to the invention, where the protective structure is a vertical extendable divider net for a vehicle.

FIG. 13 schematically depicts an embodiment where the protective structure 2A is a vertical extendable divider net for a vehicle, with a schematically depicted guide element 4A.

Figure 14:
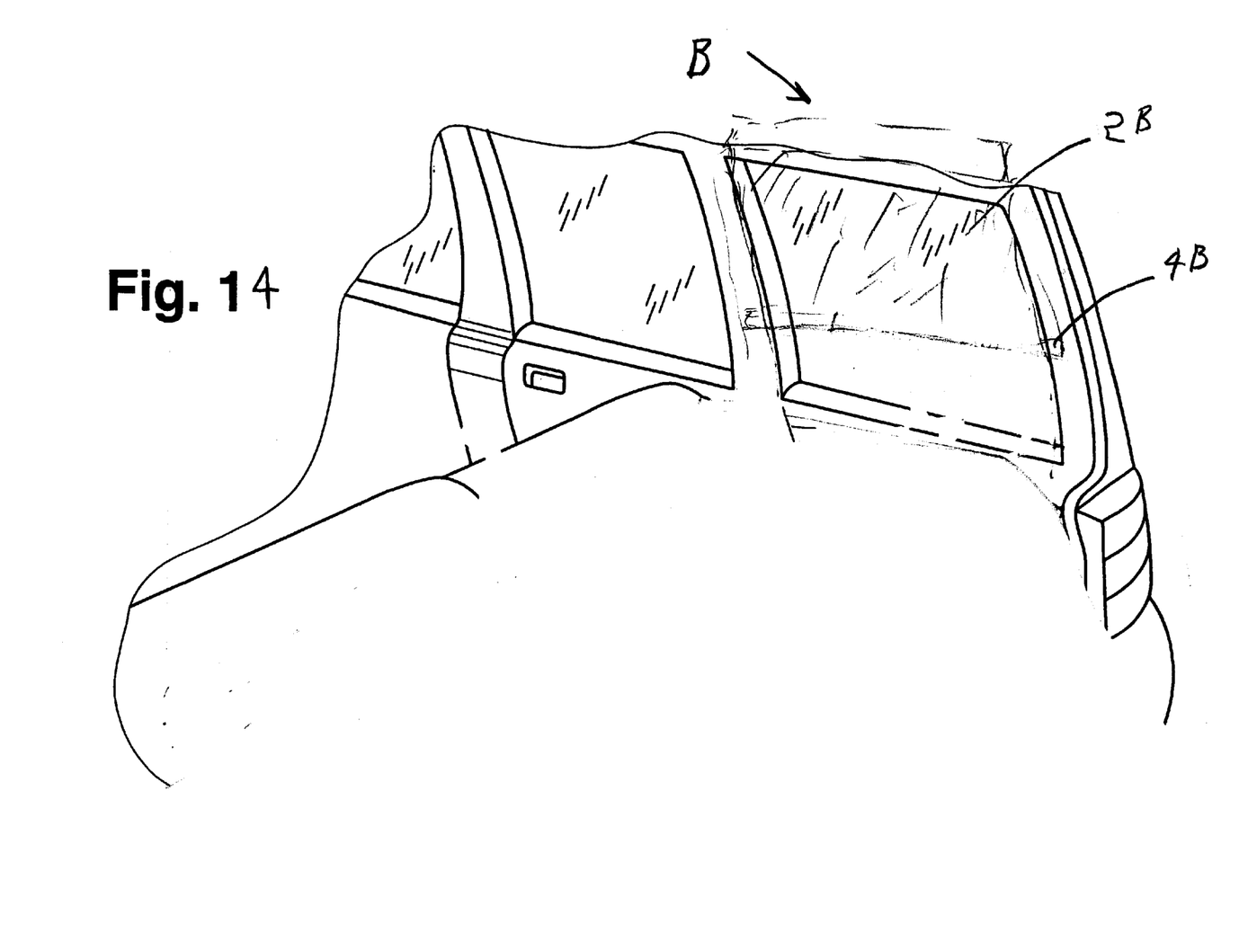
FIG. 14 is a schematic perspective view of another embodiment of a protective device according to the invention, where the protective structure is part of a roller blind for a vehicle window sunshade.

FIG. 14 schematically depicts an embodiment where the protective structure 2B is part of the roller blind B for a vehicle window sunshade, having a schematically depicted guide element 4B.

FIG. 1 includes a schematic dashed line depiction of an alternative embodiment wherein the protective structure 2B is part of a roller blind B for a vehicle window sunshade. Also shown in dashed line in FIG. 1 is a schematic depiction of a protective structure 2C figured as a vertically extendable divider net for a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Protective device for the interior of a motor vehicle comprising:

a protective structure which in use is spread out in a protective position to an at least approximately planar shape;

a drive mechanism operable to transfer the protective structure between at least two positions; and     at least one guide element connected with the protective structure and operable to be entrained by a transfer structure of the drive mechanism by at least one coupling member,     wherein the at least one coupling member is provided with at least one picking-up element that has a limited retaining force for the force-dependent picking-up, entraining and release of the guide element during movement of the coupling member.

2. Protective device according to claim 1, wherein each coupling member is seated for linear movement in a vehicle-mounted guide section to which the corresponding guide element is also associated.

3. Protective device according to claim 1, wherein the at least one picking-up element of the coupling member is mechanically active and seated to move transversely to a direction of movement of the coupling member against the force of a return spring between a holding position and releasing position.

4. Protective device according to claim 2, wherein the at least one picking-up element of the coupling member is mechanically active and seated to move transversely to a direction of movement of the coupling member against the force of a return spring between a holding position and releasing position.

5. Protective device according to claim 1, wherein the at least one coupling member includes two coupling members arranged on opposite sides of the protective structure for synchronous linear movement, each of the coupling members being operable for entraining, releasing or picking up a guide element of the protective structure.

6. Protective device according to claim 2, wherein the at least one coupling member includes two coupling members arranged on opposite sides of the protective structure for synchronous linear movement, each of the coupling members being operable for entraining, releasing or picking up a guide element of the protective structure.

7. Protective device according to claim 1, wherein each coupling member has two picking-up elements which are adjusted to opposite directions of movement of the coupling member.

8. Protective device according to claim 7, wherein one of the picking-up elements is stronger, with respect to its entraining force, than the other picking-up element.

9. Protective device according to claim 2, wherein each coupling member has two picking-up elements which are adjusted to opposite directions of movement of the coupling member.

10. Protective device according to claim 9, wherein one of the picking-up elements is stronger, with respect to its entraining force, than the other picking-up element.

11. Protective device according to claim 3, wherein each coupling member has two picking-up elements which are adjusted to opposite directions of movement of the coupling member.

12. Protective device according to claim 11, wherein one of the picking-up elements is stronger, with respect to its entraining force, than the other picking-up element.

13. Protective device according to claim 5, wherein each coupling member has two picking-up elements which are adjusted to opposite directions of movement of the coupling member.

14. Protective device according to claim 13, wherein one of the picking-up elements is stronger, with respect to its entraining force, than the other picking-up element.

15. Protective device according to claim 1, wherein at least one stationary stop, serving to secure the protective structure in different positions, is associated with the at least one guide element, which stop can be transferred by the at least one coupling member into a releasing position in which it permits the protective structure to move.

16. Protective device according to claim 15, wherein the stops are configured as spring-loaded, elastically resilient blocking elements provided with ramps for the respective coupling member.

17. Protective device according to claim 2, wherein at least one stationary stop, serving to secure the protective structure in different positions, is associated with the at least one guide element, which stop can be transferred by the at least one coupling member into a releasing position in which it permits the protective structure to move.

18. Protective device according to claim 17, wherein the stops are configured as spring-loaded, elastically resilient blocking elements provided with ramps for the respective coupling member.

19. Protective device according to claim 3, wherein at least one stationary stop, serving to secure the protective structure in different positions, is associated with the at least one guide element, which stop can be transferred by the at least one coupling member into a releasing position in which it permits the protective structure to move.

20. Protective device according to claim 19, wherein the stops are configured as spring-loaded, elastically resilient blocking elements provided with ramps for the respective coupling member.

21. Protective device according to claim 5, wherein at least one stationary stop, serving to secure the protective structure in different positions, is associated with the at least one guide element, which stop can be transferred by the at least one coupling member into a releasing position in which it permits the protective structure to move.

22. Protective device according to claim 21, wherein the stops are configured as spring-loaded, elastically resilient blocking elements provided with ramps for the respective coupling member.

23. Protective device according to claim 7, wherein at least one stationary stop, serving to secure the protective structure in different positions, is associated with the at least one guide element, which stop can be transferred by the at least one coupling member into a releasing position in which it permits the protective structure to move.

24. Protective device according to claim 23, wherein the stops are configured as spring-loaded, elastically resilient blocking elements provided with ramps for the respective coupling member.

25. Protective device according to claim 1, wherein the protective structure is a flexible member which is wound on a roller and is movable to positions covering a vehicle cargo space.

26. Protective device according to claim 1, wherein the protective structure is part of a roller blind for a vehicle window sunshade.

27. Protective device according to claim 1, wherein the protective structure is a vertically extendable divider net for a vehicle.

* * * * *